United States Patent
Kalmykov et al.

[11] 4,249,989
[45] Feb. 10, 1981

[54] ISOLATING SOLID SUBSTANCES FROM A VAPOR AND GAS MIXTURE AND PULPS

[76] Inventors: Vladimir N. Kalmykov, ulitsa Lermontova, 2-19; Vitaly A. Musiiko, ulitsa Lermontova, 19, kv. 55; Leonid P. Khlopkov, ulitsa 40 let Sovetskoi Ukrainy, 24-11; Stanislav I. Gashenko, ulitsa Gorkogo, 159, kv. 76; Alexandr A. Rogatkin, ulitsa 40 let Sovetskoi Ukrainy, 76, kv. 3; Grigory I. Silakov, ulitsa Yatsenko, 4a, kv. 59, all of Zaporozhie, U.S.S.R.; Viktor F. Shipilov, deceased, late of Zaporozhie, U.S.S.R.; by Elena S. Skibina, administrator, prospekt Lenina, 200, kv. 7, Zaporozhie, U.S.S.R.; by Gennady V. Shipilov, administrator, prospekt Lenina, 200, kv. 7, Zaporozhie, U.S.S.R.; by Fedor D. Shipilov, administrator, prospekt Lenina, 200, kv. 7, Zaporozhie, U.S.S.R.

[21] Appl. No.: 78,038
[22] Filed: Sep. 24, 1979
[51] Int. Cl.³ ............................................. B01D 1/24
[52] U.S. Cl. ................................. 159/10; 159/11 A; 159/6 W; 55/82
[58] Field of Search ............... 159/6 W, 9 R, 10, 9 A, 159/8, 11 A, 11 R, DIG. 5; 55/82

[56] References Cited
U.S. PATENT DOCUMENTS

| | | |
|---|---|---|
| 1,258,988 | 3/1918 | Coster et al. ............... 159/11 A |
| 2,403,978 | 7/1946 | Hickman et al. ............ 159/6 W |
| 2,542,270 | 2/1951 | Zahm ............................ 159/6 W |
| 3,163,587 | 12/1964 | Champe ...................... 159/11 A |

*Primary Examiner*—Norman Yudkoff
*Attorney, Agent, or Firm*—Lackenback, Lilling & Siegel

[57] ABSTRACT

A condenser for isolating solid substances from a vapor and gas mixture and pulps comprises a vertical cylindrical casing having a conical bottom and a vertical rotary drum accommodated in the casing and adjoining with its outer periphery to vertically extending internal protrusions of the casing walls in such a manner that the drum and the protrusions form a vertical transversal partition wall which is in a spaced relationship with respect to the casing bottom, and the interior of the casing represents a U-shaped space. Pipes for admission of a vapor and gas mixture and a pulp that does not contain rare-earth metals are provided in the upper portion of one inlet branch of the U-shaped space, and a pipe for discharge of the vapor and gas mixture cleaned from solid substances is provided in the upper portion of the other outlet branch of the U-shaped space. A pipe for removal of solid substances is provided in the lower portion of the conical bottom. The condenser is also provided with a pipe for feeding a pulp containing rare-earth metals to the inner walls of the drum, a device for distributing the pulp being fed over the inner walls of the drum and for cleaning them, and a pipe for removal of solid substances from the lower portion of the drum and means for removal of vapor from the drum.

5 Claims, 5 Drawing Figures

ISOLATING SOLID SUBSTANCES FROM A VAPOR AND GAS MIXTURE AND PULPS

The invention relates to metal production, and more particularly to the production of rare-earth metals by chlorination, and deals with the construction of a condenser for isolating solid substances from a vapor and gas mixture and pulps. The condenser according to the invention may be most advantageously used in the production of titanium and accompanying metals by chlorination.

In the production of rare-earth metals with the use of chlorination, a high-temperature vapor and gas mixture is obtained which contains vaporous chlorides, such as titanium, aluminum, silicon, manganese and chlorides and carries particles of solid unchlorinated feedstock, as well as pulps of basically two types: a pulp comprising a suspension of solids, mainly chlorides, settled in a mixture of liquid chlorides and a pulp obtained after the cleaning of liquid chlorides. The latter pulp contains valuable components isolated from liquid chlorides, such as vanadium, tantalum, niobium, and components used for purification of liquid chlorides, such as copper.

Known in the art is a condenser for isolating solid substances from a vapor and gas mixture and pulps in the production of rare-earth metals by chlorination, comprising a vertical cylindrical casing having a conical bottom. The casing is divided by a vertical partition wall which is in a spaced relationship with respect to the conical bottom so that the interior of the condenser represents a U-shaped space.

A pipe for admission of a vapor and gas mixture and pulp is provided in the upper portion of one inlet branch of the U-shaped space, and pipes for discharging the vapour and gas mixture cleaned from solid substances are provided in the upper portion of the other outlet branch of the U-shaped space. A pipe for removal of solid substances is provided in the lower portion of the conical bottom of the casing.

In the use of the prior art condenser in the production of titanium, a vapour and gas mixture at 700°–100° C. carrying fine particles of unchlorinated feedstock is admitted to the inlet branch of the U-shaped space of the condenser. The vapor and gas mixture gives up a part of its heat to the environment (surrounding air) through the outer walls of the condenser casing. Thus a certain fraction of the vapour and gas mixture, namely iron, calcium, manganese and like chlorides turn into solids. Upon a change of direction of flow of the vapour and gas mixture stream which occurs when the stream flows around the partition wall, solid substances from the vapor and gas mixture are thrown by centrifugal force against the conical bottom of the casing and removed from the condenser through the pipe provided therein. The vapor and gas mixture is partially condensed on cool walls and the partition wall of the condenser casing, and solid substances are partially deposited on the walls and partition wall to form a deposit impeding the heat removal. When the deposit layer becomes as thick as 30 mm, the heat removal abruptly decreases, and the throughput capacity of the condenser drops by 1.5-2 times. To clean the walls from the deposit, the condenser is disconnected from the condensing system. Suspending condenser operation lowers the capacity of the condensing system, and the cleaning operation is arduous work. Dust and gas contamination of air at the working sites increases thus reducing overall labor productivity.

A pulp obtained in the production of rare-earth metals is fed through the pipe for admission to the condenser, into the stream of the vapor and gas mixture.

A liquid fraction of the pulp evaporates under the action of heat from the vapor and gas mixture and is mixed with the vapor and gas mixture to be discharged from the condenser. Solid components of the pulp precipitate to the conical bottom of the condenser and are removed through a pipe.

However, in the prior art condenser it is advantageous to process only pulps which do not contain valuable components. Otherwise, these components are mixed with other solid substances isolated in the condenser and lost since their extraction from dust obtained in the condenser is expensive and inexpedient. Therefore, special furnaces and other equipment are to be used for processing pulps containing valuable components.

To ensure complete evaporation of the pulp, it should be fed to the condenser in small batches with thorough atomization which is difficult. Otherwise, liquid chloride wets the dust settled on the condenser bottom, and the removal of dust from the condenser poses a problem.

Besides, during evaporation of liquid from the pulp substances contaminating the vapor and gas mixture, noxious impurities evaporate, and the mixture will have to be purified anew to remove them.

It is an object of the invention to provide a condenser ensuring the processing of all kinds of pulps and separate removal of valuable solid components from the condenser without mixing with the remaining solid chlorides.

Another object of the invention is to provide a condenser in which a vapor and gas mixture is not contaminated with noxious impurities obtained in evaporating the pulp containing valuable components.

A further object of the invention is to improve the pulp throughput capacity of the condenser.

The invention resides in a condenser for isolating solid substances from a vapor and gas mixture and pulps in the production of rare-earth metals by chlorination, comprising a vertical cylindrical casing having a conical bottom and a vertical transversal partition wall which is secured inside the casing and is in a spaced relationship with respect to the bottom of the cylindrical casing so that the interior of the cylindrical casing represents a U-shaped space; pipes for admission of a vapor and gas mixture and pulp provided in the upper portion of one inlet branch of the U-shaped space, a pipe for discharge of the vapor and gas mixture cleaned from solid substances provided in the upper portion of the other outlet branch of the U-shaped space, and a pipe for removal of solid substances provided in the lower portion of the conical bottom, according to the invention the transversal partition wall is formed by two inner protrusions of the walls of the cylindrical casing and a vertical rotary drum adjoining the protrusions with the outer periphery thereof, the drum having a pipe for feeding a pulp containing rare-earth metals onto the inner walls thereof, a device for distributing the pulp fed over the inner walls of the drum and for cleaning them, a pipe for removal of solid substances from the lower portion of the drum and a device for removal of vapors from the drum, the pipe for admission of pulp provided in the inlet branch of the U- shaped space being directed towards the outer periphery of the drum.

The condenser according to the invention enables the utilization of heat from the vapor and gas mixture for separate evaporation of the pulp containing rare-earth metal components and the pulp that does not contain such components, thus ensuring separate collection of solid components isolated from such pulps which contain rare-earth metal components suitable for extraction of vanadium, tantalum and other valuable metals. Separate evaporation of pulps permits vapors containing valuable substances to be removed either together with the vapor and gas mixture cleaned from solid particles or separately.

As the pulp fed to the wall of the rotary drum is spread thereover in the form of a thin film, the surface area of the pulp evaporation increases, hence the rate of pulp evaporation increases, and the throughput capacity of the condensing system as a whole is also improved.

The device for distributing the pulp being fed over the inner walls of the drum and for cleaning them may comprise stationary vertical brushes mounted inside the drum and adjoining to the inner walls thereof along generatrix lines.

While being simple in structure, such brushes appropriately distribute the pulp over the wall of the rotary drum and reliably remove the dried solid layer from the surface thereof.

The device for distributing the pulp being fed over the inner walls of the drum and for cleaning them may also comprise brushes secured to turns of a screw mounted inside the drum. This construction is advantageous in that by distributing the pulp, the latter may be retained for a longer period in the upper, hotter portion of the rotary drum, and hence evaporate more rapidly.

Blades for distributing the pulp and cleaning the outer periphery of the drum are preferably provided on longitudinal edges of the inner protrusions adjoining to the outer periphery of the drum.

In the condenser according to the invention, the main fraction of heat of the vapor and gas mixture is taken by the drum walls, rather than by the casing walls, and a layer of deposit which accumulates mainly on the drum walls is removed therefrom by the blades during operation of the condenser thus improving the throughput capacity of the condenser, eliminating heavy manual labor for cleaning with high gas concentration and enhancing the sanitary conditions in the working environment around the condenser.

Futhermore, by placing the blades at a desired distance from the drum surface, a pre-set layer of deposit may be retained thereon so as to protect the drum wall against chlorination with hot chlorine gas breaking through with the vapor and gas mixture.

The walls of the rotary drum are preferably made hollow and provided with pipes for admission and discharge of a coolant. This facility enables a constant temperature on the drum wall surface to be maintained, hence the pulp may be evaporated in such a manner as to remove therefrom only those components which have the boiling temperature below a temperature of the rotary drum wall.

The invention will now be described in detail with reference to specific embodiments illustrated in the accompanying drawings, in which.

Figure 2:
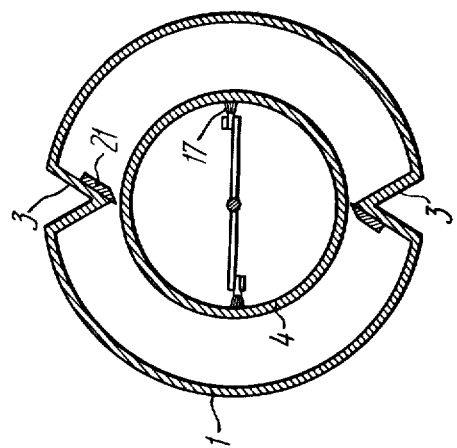
FIG. 2 is a sectional view taken along the line II—II in FIG. 1.
Figure 3:
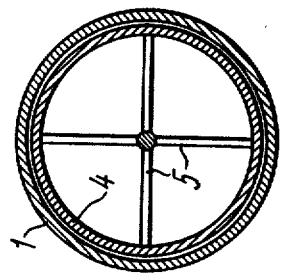
FIG. 3 is a sectional view taken along the line III—III in FIG. 1.

The condenser for isolating solid substances from a vapor and gas mixture and pulps in the production of rare-earth metals by chlorination comprises a vertical cylindrical casing 1 (FIG. 1) having a conical bottom 2. The casing 1 accommodates a vertical transversal partition wall which is in a spaced relationship with respect to the bottom wall 2 and is formed by two internal vertical protrusions 3 (FIG. 2) on the casing 1 and by a vertical rotary drum 4 which adjoins the protrusions 3 with its outer surface. The drum 4 is secured by means of spokes 5 (FIGS. 1, 3) to a shaft 6 (FIG. 1) which is rotated by a drive 7. The vertical transversal partition wall formed by the protrusions 3 (FIG. 2) and the drum 4 (FIG. 1) divides the interior of the casing 1 to define a U-shaped inner space. The upper portion of the inlet branch of the U-shaped space is provided with a pipe 8 for admission of a vapor and gas mixture and a pipe 9 for admission of a pulp that does not contain rare-earth metals, the pipe 9 being directed towards the outer periphery of the drum 4. The upper portion of the other, outlet branch of the U-shaped space is provided with a pipe 10 for discharging the vapor and gas mixture cleaned from solid substances. A pipe 11 for removal of solid substances is provided in the lower portion of conical bottom 2. A pipe 12 for feeding a pulp containing rare-earth metals to the inner wall of the drum 4 is connected to the casing 1 over the interior of the drum 4. For removing vapors released in the drum 4 during evaporation of the pulp, there is provided means for removing vapor comprising a pipe 13 located over the drum 4. In another embodiment of the invention, where it is not required to remove vapors from the drum separately from the cleaned a vapor and gas mixture, a hole 14 (FIG. 4) of the wall of the drum 4a may be used as a vapor removal means. The walls of the drum 4a are made hollow and provided with a pipe 15 for admission of a coolant thereto and a pipe 16 for discharge of a coolant therefrom.

Both the drum 4 (FIG. 1) and the drum 4a (FIG. 4) accommodate a device for distributing the pulp being fed over the drum walls and for cleaning them.

This device comprises stationary vertical brushes 17 (FIG. 1) adjoining to the inner walls of the drum 4 along generatrix lines to distribute the pulp in the form of a thin layer over the inner wall of the drum 4 and to clean the wall from solid substances formed as a result of evaporation of the pulp.

Figure 5:
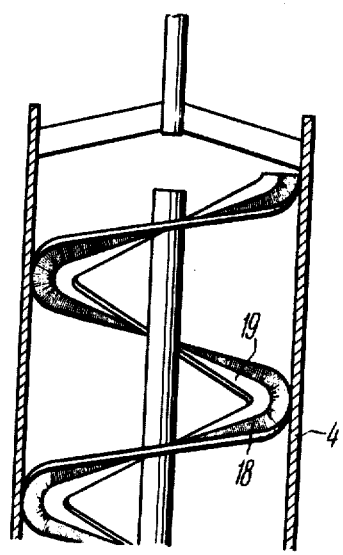
FIG. 5 is a longitudinal section of an embodiment of the device for distributing the pulp being fed over the inner walls of the condenser drum and for cleaning them, according to the invention.

This device may alternatively comprise brushes 18 (FIG. 5) secured to turns of a screw 19 mounted inside the drum 4.

A pipe 20 mounted under the lower portion of the drum 4 (FIG. 1) is designed for removal of solid substances from the drum 4. The pipe 20 has an enlarged conical portion at the top which surrounds the outer wall of the drum 4 and is rigidly secured to the casing 1.

Blades 21 are mounted to the longitudinal edges of the internal protrusions 3 adjoining to the outer periphery of the drum 4 (FIG. 2) for distributing the pulp and cleaning the periphery of the drum 4 from solid substances deposited thereto during evaporation of the pulp and released from the pulp during condensation.

The operation of the condenser according to the invention will now be described as applied to the production of titanium.

Figure 1:
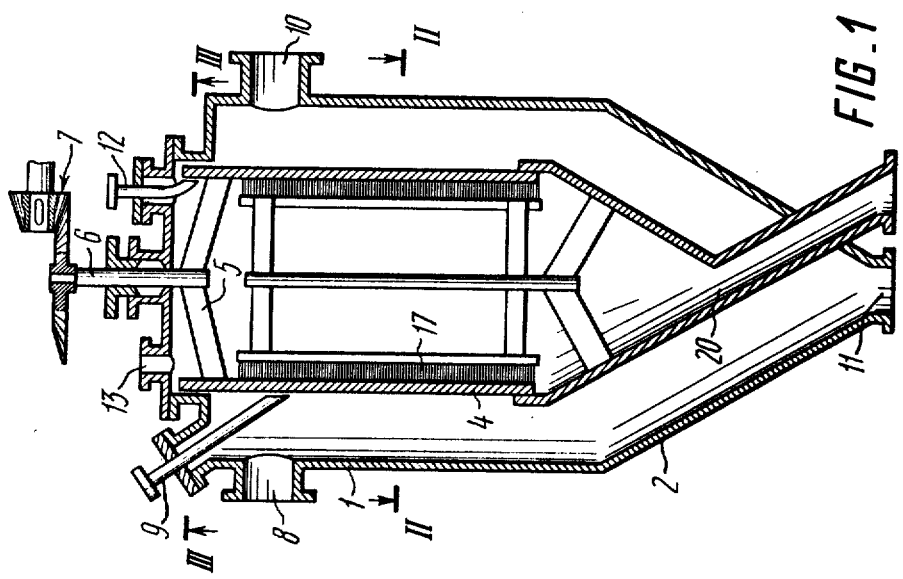
FIG. 1 shows a longitudinal section of the condenser for isolating solid substances from a vapor and gas mixture and pulps in the production of rare-earth metals by chlorination, according to the invention.
Figure 4:
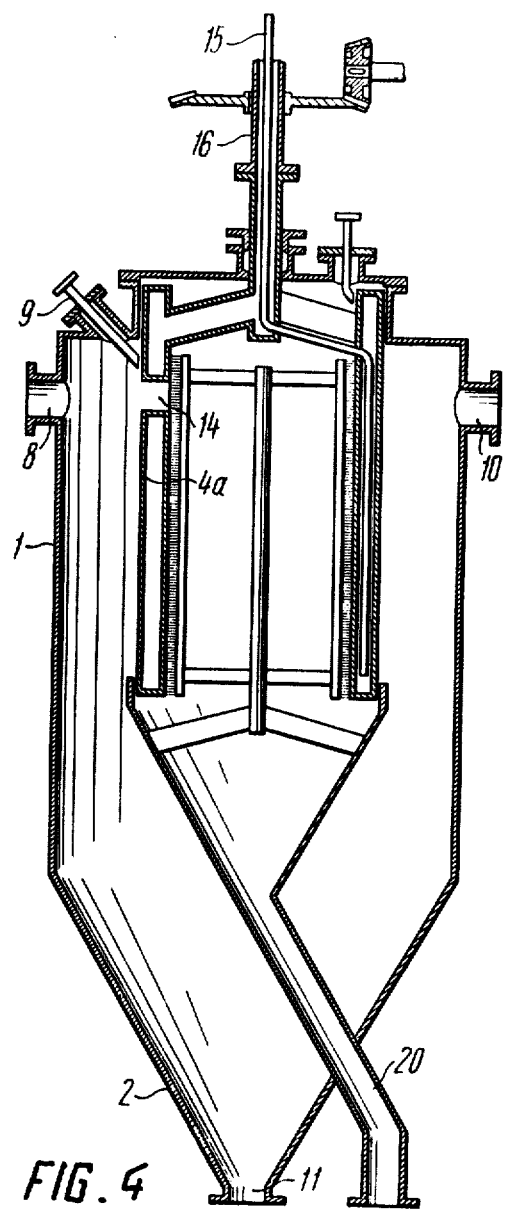
FIG. 4 is a longitudinal section of an embodiment of the condenser for isolating solid substances from a vapor and pulps, according to the invention.

A vapor and gas mixture obtained after chlorination of a titanium-containing feedstock is admitted through the pipe 8 (FIG. 1) to the interior of the casing 1 at 700°–1000° C. A part of the heat of the vapor and gas mixture is removed through the outer wall of the casing 1 into the environment, and a part is utilized to heat the walls of the rotary drum 4 or a coolant circulating in the hollow walls of the drum 4a (FIG. 4). The coolant preferably comprises liquid chlorides condensed in the production cycle. The stream of the vapor and gas mixture flows around the partition wall formed by the protrusions 3 (FIG. 2) and the drum 4 and discharged from the casing 1 through the pipe 10 (FIG. 1). Upon the change in the direction of flow when the stream flows around the partition wall, solid particles of unchlorinated titanium-containing feed-stock entrained with the vapor and gas mixture and condensed therefrom during the cooling (aluminum, silicon and other chlorides) deposit on the conical bottom 2 and are removed from the casing 1 through the pipe 11.

A pulp in the form of a suspension of solid substances, mainly chlorides precipitated in the mixture of liquid chlorides, is fed to the outer wall of the drum 4 through the pipe 9. The pulp is distributed by the blades 21 (FIG. 2) over the periphery of the drum 4 in the form of a thin layer and evaporates due to the heat of the vapor and gas mixture. Solid substances remaining after evaporation of the pulp, as well as those deposited to the outer wall of the drum 4 during condensation of the vapor and gas mixture are removed by the same blades 21 and fall down to the conical bottom 2 wherefrom they are removed through the pipe 11.

A pulp obtained during purification of liquid chlorides and containing valuable components, such as vanadium, titanium, niobium and components used for purification of liquid chlorides, such as copper, is fed to the inner walls of the drum 4 through the pipe 12. The pulp is distributed by the brushes 17 or 18 (FIG. 5) in the form of a thin layer over the inner wall of the drum 4 which is heated by the heat of the vapor and gas mixture, and evaporates. Solid substances obtained during evaporation of the pulp are removed by the brushes 18 or brushes 17 (FIG. 1) from the walls of the drum 4 and get into the pipe 20 to be removed from the condenser casing 1 without mixing with the solid substances removed through the pipe 11, and may be fed for further processing to extract the valuable components. The vapors obtained during evaporation of pulp inside the drum 4 are discharged therefrom through the pipe 13 and fed for antonomous condensation or removed from the drum 4a (FIG. 4) through the hole 14 to the interior of the casing 1 to be mixed with the vapor and gas mixture and removed therewith through the pipe 10.

We claim:

1. A condenser for isolating solid substances from vapor and gas mixture and pulps in the production of rare-earth metals by chlorination, comprising: a vertical cylindrical casing having a conical bottom; two internal vertical extending protrusions on the walls of said cylindrical casing in a spaced relationship with respect to said bottom thereof; a vertical rotary drum accommodated in said casing and adjoining said protrusions with the other periphery thereof so that said protrusions and rotary drum define a vertical transversal partition wall which is in a spaced relationship with respect to said casing bottom, the interior of said casing defining a U-shaped space; a pipe for admission of a vapor and gas mixture provided in the upper portion of one inlet branch of said U-shaped space; a pipe for admission of a pulp provided in the upper portion of said inlet branch of the U-shaped space and directed towards the outer periphery of said drum; a pipe for discharge of the vapor and gas mixture cleaned from solid substances provided in the upper portion of the other outlet branch of said U-shaped space; a pipe for removal of solid substances provided in the lower portion of said conical bottom; a pipe for feeding a pulp containing rare-earth metals to the inner walls of the said drum; a device for distributing the pulp being fed over the inner walls of the said drum and for cleaning them; a pipe for removal of solid substances from the lower portion of said drum; and means for removing vapors from said drum.

2. A condenser according to claim 1, also comprising brushes for distributing the pulp being fed over the inner walls of the drum and for cleaning them, the brushes being mounted inside the drum and adjoining the inner walls thereof along generatrix lines.

3. A condenser according to claim 1, also comprising a screw for distributing the pulp being fed to the inner walls of said drum and for cleaning them, the screw being mounted inside the drum and brushes secured to said screw.

4. A condenser according to claim 1, also comprising blades for distributing the pulp and for cleaning the outer periphery of the drum which are mounted on said protrusions adjoining the outer periphery of the drum.

5. A condenser according to claim 1, also comprising walls of said drum which are made hollow and pipes for admission of a coolant to and for its discharge from said walls.

* * * * *